US010387179B1

(12) United States Patent
Hildebrant et al.

(10) Patent No.: US 10,387,179 B1
(45) Date of Patent: Aug. 20, 2019

(54) ENVIRONMENT AWARE SCHEDULING

(71) Applicant: Amazon Technologies, Inc., Seattle, WA (US)

(72) Inventors: Todd Christian Hildebrant, Leesburg, VA (US); David Blake Pellerin, Bellevue, WA (US); Dougal Stuart Ballantyne, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/572,592

(22) Filed: Dec. 16, 2014

(51) Int. Cl.
*G06F 9/46* (2006.01)
*G06F 9/455* (2018.01)
*G06F 9/48* (2006.01)
*G06F 9/50* (2006.01)

(52) U.S. Cl.
CPC ...... *G06F 9/45558* (2013.01); *G06F 9/45533* (2013.01); *G06F 9/48* (2013.01); *G06F 9/5061* (2013.01); *G06F 2009/4557* (2013.01); *G06F 2009/45562* (2013.01); *G06F 2009/45579* (2013.01); *G06F 2009/45595* (2013.01)

(58) Field of Classification Search
CPC ...... G06F 9/455; G06F 9/4881; G06F 9/5016; G06F 9/45537; G06F 9/45558; G06F 11/008; G06F 9/4856; G06F 9/5072; G06F 8/63; G06F 1/206; G06F 2009/4557; G06F 2009/45579; G06F 2009/45595; G06F 2009/45562; H04L 4/5025; H04L 63/102; H04L 41/0823
See application file for complete search history.

(56) References Cited

U.S. PATENT DOCUMENTS

| | | | | |
|---|---|---|---|---|
| 8,397,088 B1* | 3/2013 | Ghose | ................... | G06F 1/206 713/300 |
| 8,656,018 B1* | 2/2014 | Keagy | ..................... | G06F 8/63 709/220 |
| 2004/0054780 A1* | 3/2004 | Romero | ............. | H04L 41/5025 709/226 |
| 2005/0120160 A1* | 6/2005 | Plouffe | ............... | G06F 9/45537 711/1 |
| 2007/0083655 A1* | 4/2007 | Pedersen | ............... | H04L 63/102 709/226 |
| 2009/0265361 A1* | 10/2009 | Nagami | ................ | G06F 9/5072 |
| 2009/0276771 A1* | 11/2009 | Nickolov | .............. | G06F 9/4856 717/177 |
| 2010/0318993 A1* | 12/2010 | Goud | ................... | G06F 9/45537 718/1 |
| 2011/0078679 A1* | 3/2011 | Bozek | ..................... | G06F 9/455 718/1 |
| 2012/0284398 A1* | 11/2012 | Durham | .............. | H04L 41/0823 709/224 |
| 2014/0096139 A1* | 4/2014 | Alshinnawi | .......... | G06F 11/008 718/103 |

(Continued)

*Primary Examiner* — Tuan A Vu
(74) *Attorney, Agent, or Firm* — BakerHostetler

(57) ABSTRACT

Techniques are provided for scheduling tasks to a plurality of computing nodes, such as physical computers and virtual machine instances. Based on operational parameters of the computing nodes and process parameters of the compute tasks to be executed, one or more of the computing nodes can be selectively clustered to compute tasks in an optimized manner. As an example, the order in which the tasks are executed can be determined to maintain the optimization of the task execution.

20 Claims, 7 Drawing Sheets

(56) References Cited

U.S. PATENT DOCUMENTS

| | | | |
|---|---|---|---|
| 2014/0181833 A1* | 6/2014 | Bird | G06F 9/5016 718/105 |
| 2015/0063166 A1* | 3/2015 | Sif | G06F 9/45558 370/254 |
| 2015/0074670 A1* | 3/2015 | Gerganov | G06F 9/4881 718/103 |

* cited by examiner

ENVIRONMENT AWARE SCHEDULING

BACKGROUND

There exist web services platforms that may perform compute tasks for remote client computers or other entities. These web services platforms may comprise a plurality of datacenters, which may each comprise a plurality of physical host computers that in turn host one or more virtual machine (VM) instances (as used herein, both physical computers and VM instances may be referred to as computing nodes). Certain compute tasks (e.g., jobs) may be executed by one or more of the computing nodes.

BRIEF DESCRIPTION OF DRAWINGS

Throughout the drawings, reference numbers may be re-used to indicate correspondence between referenced elements. The drawings are provided to illustrate example aspects described herein and are not intended to limit the scope of the disclosure.

DETAILED DESCRIPTION

In an aspect, a task scheduler may cluster certain tasks and/or computing resources (e.g., computing nodes) in a web services environment based upon information relating to the operation of the web services environment. For example, health of a resource, latency, location, load, instance size, operational performance, storage performance, and other parameters can be leveraged to determine how tasks should be clustered and/or how the execution of the tasks should be ordered. As a further example, given a heterogeneous group of computing nodes and a task with certain process requirements (parameters), a group of computing nodes may be selected (e.g., partitioned, designated) into an optimized cluster to execute select tasks and to report status. Such a system may execute several tasks in parallel or serial, while optimizing to different constraints (e g, minimize cost or execution time, maximize utilization, etc.) The present systems and methods provide for an intelligent scheduling of process jobs to optimized clusters of one or more computing nodes based on a multi-parameter space (e.g., processing cost, infrastructure topology, priority schedule, number of nodes, load, customer identifier, location, etc.).

Figure 1:
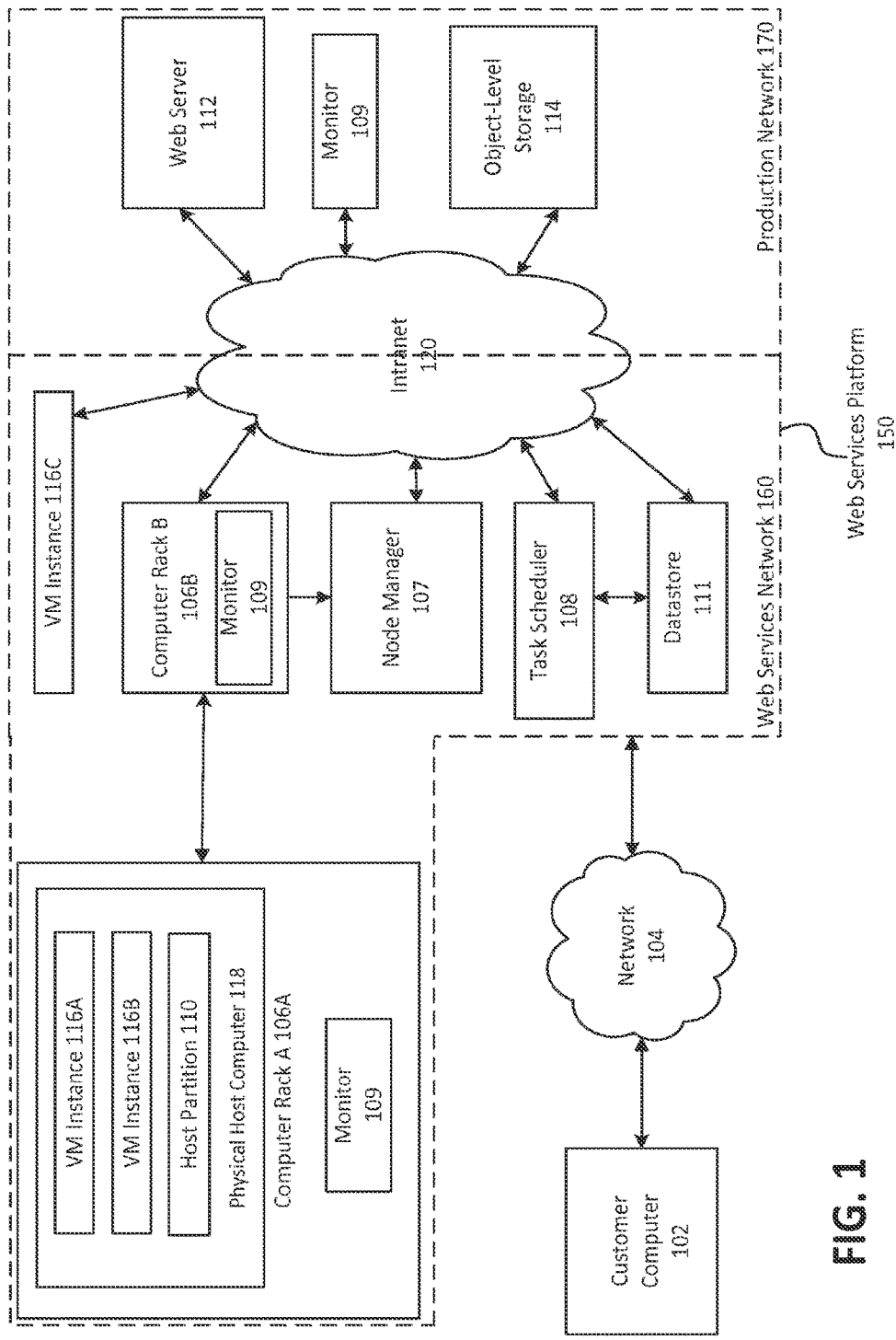
FIG. 1 depicts an example operating environment in which aspects may be implemented.
Figure 2:
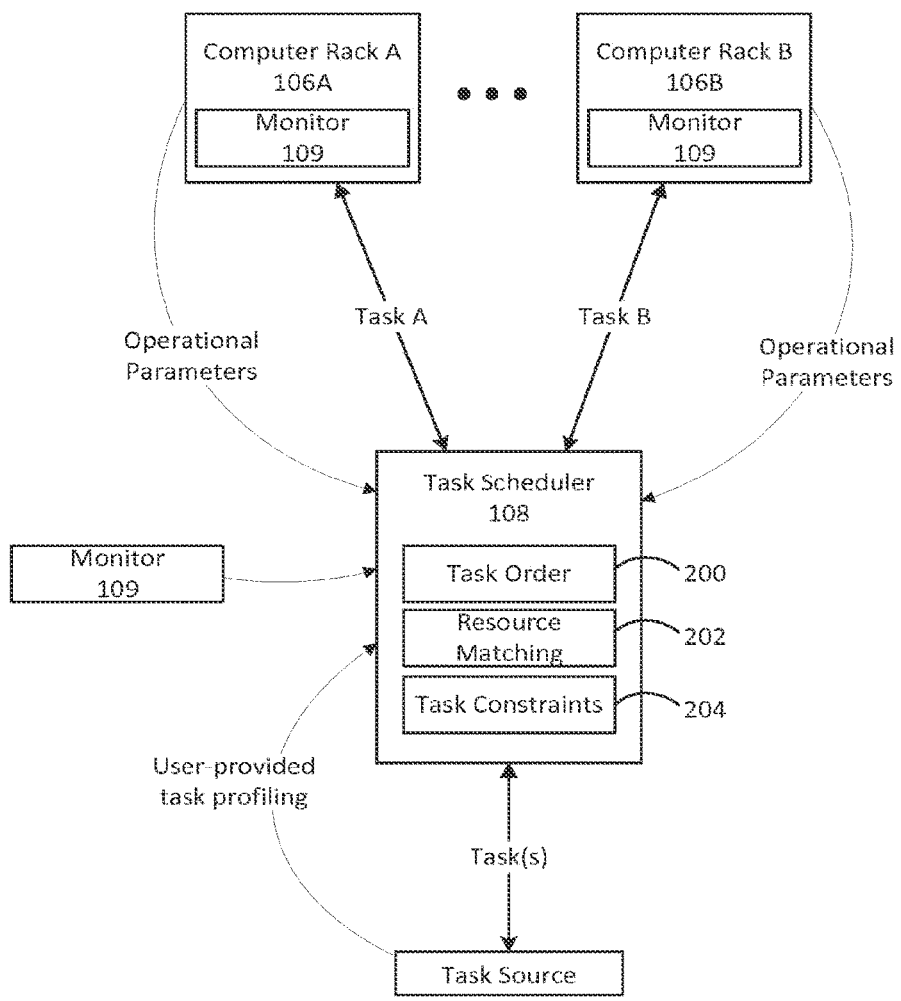
FIG. 2 depicts an example data flow relating to the scheduling of tasks to one or more computing nodes in an operating environment, such as the operating environment of FIG. 1.
Figure 3:
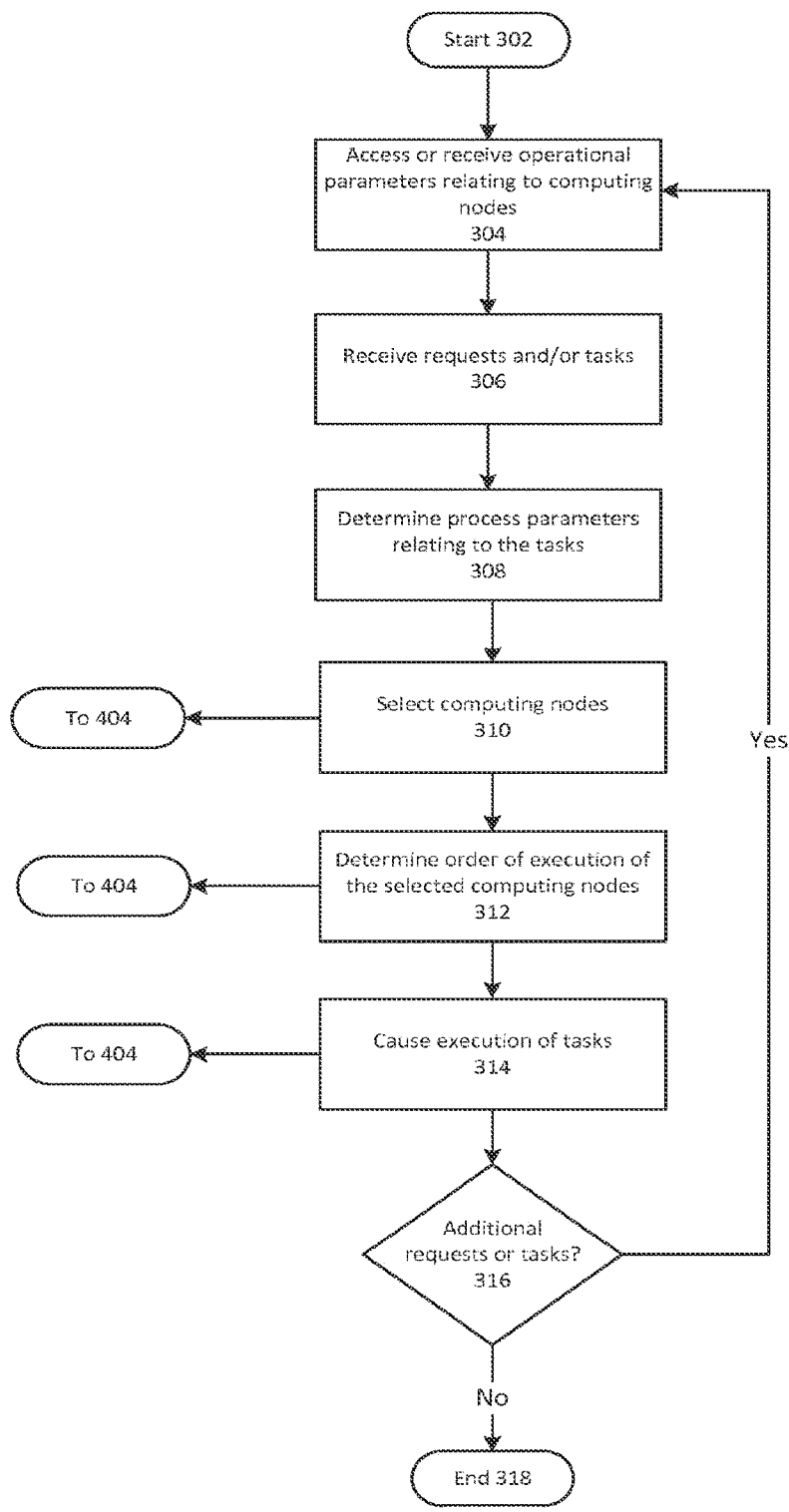
FIG. 3 depicts example operating procedures for scheduling tasks to one or more computing nodes in an operating environment, such as the operating environment of FIG. 1.
Figure 4:
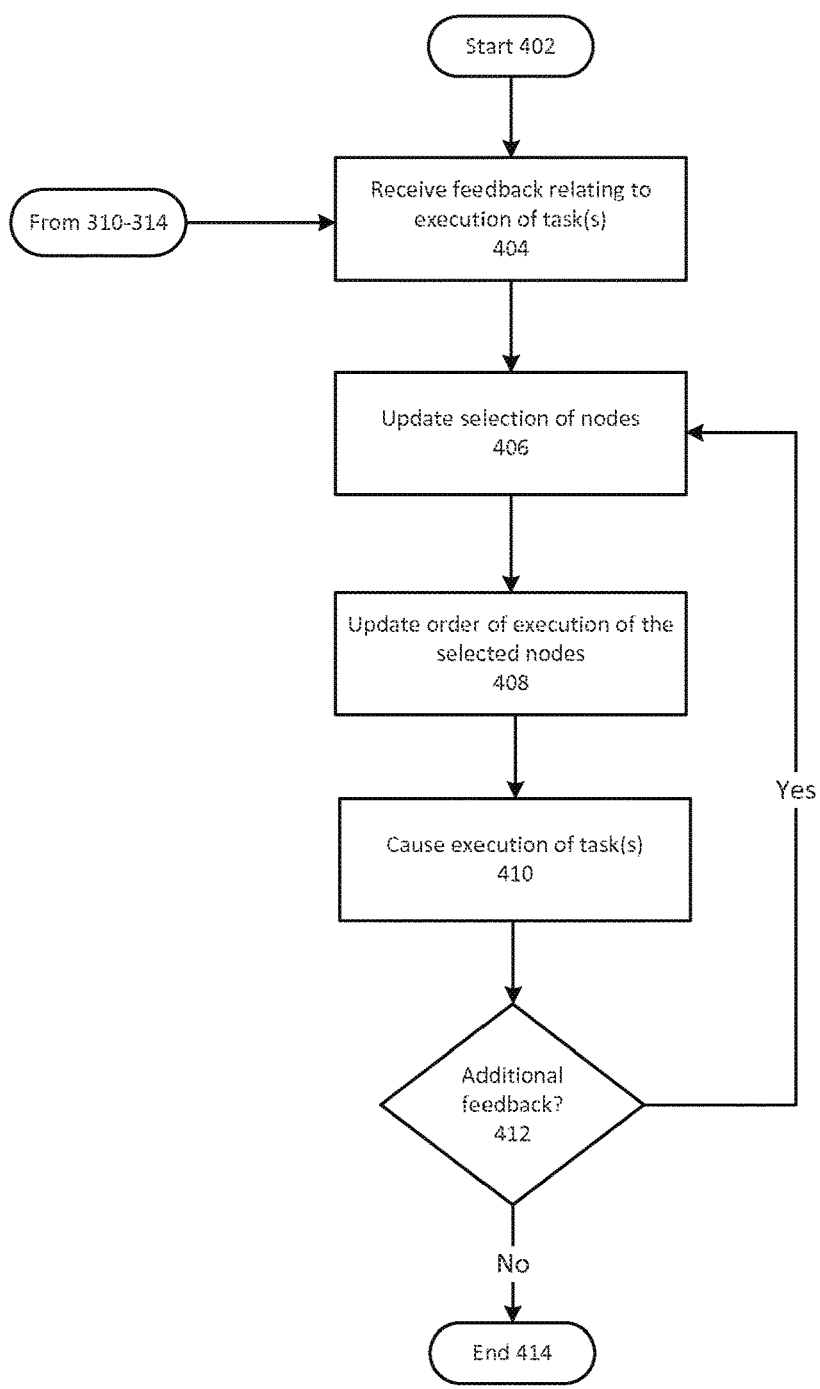
FIG. 4 depicts example operating procedures for scheduling tasks to one or more computing nodes in an operating environment, such as the operating environment of FIG. 1.
Figure 5:
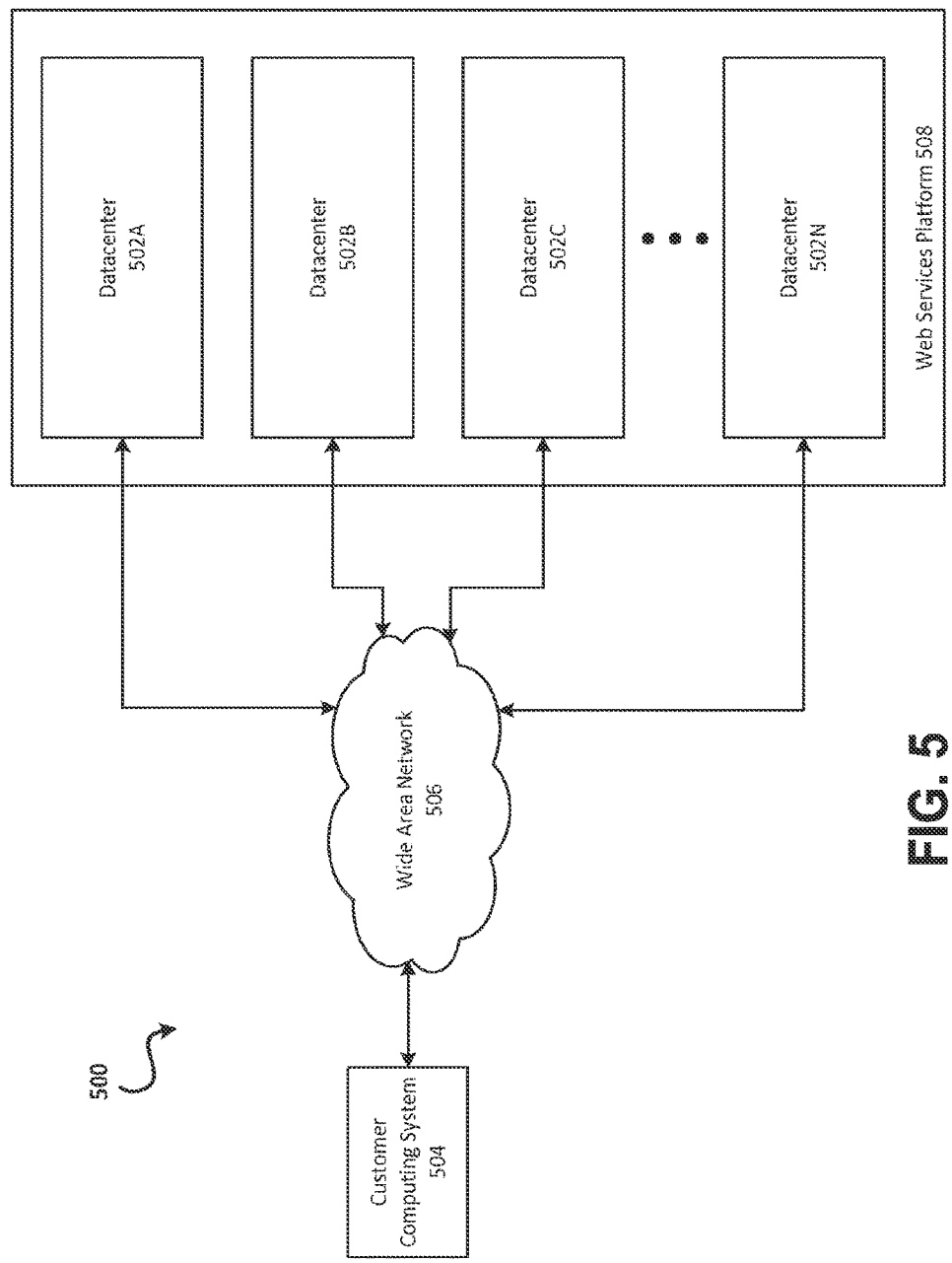
FIG. 5 depicts a web services platform, such as in FIG. 1, that comprises a plurality of datacenters.
Figure 6:
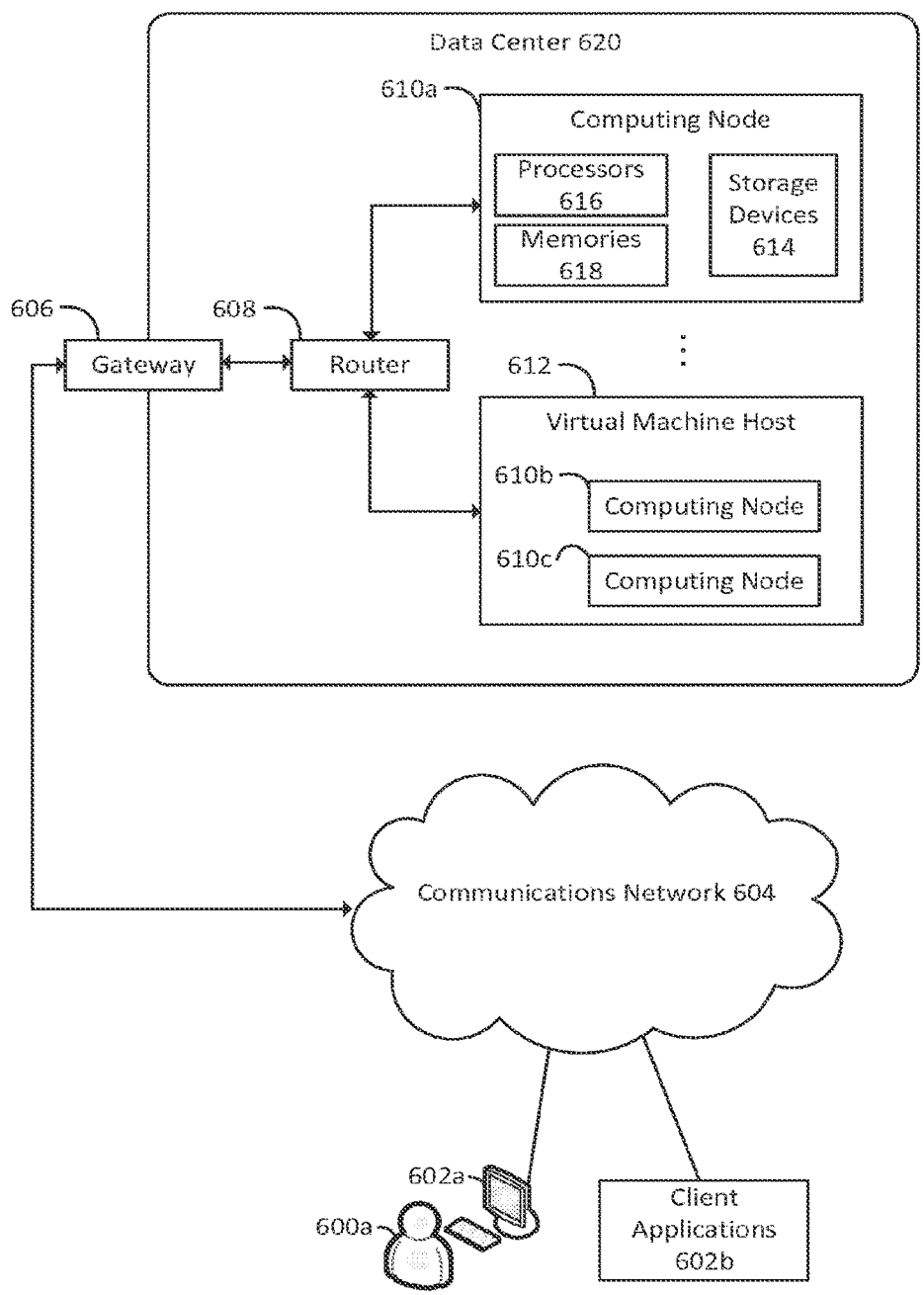
FIG. 6 depicts a datacenter, such as in FIG. 5, that comprises a plurality of computers.
Figure 7:
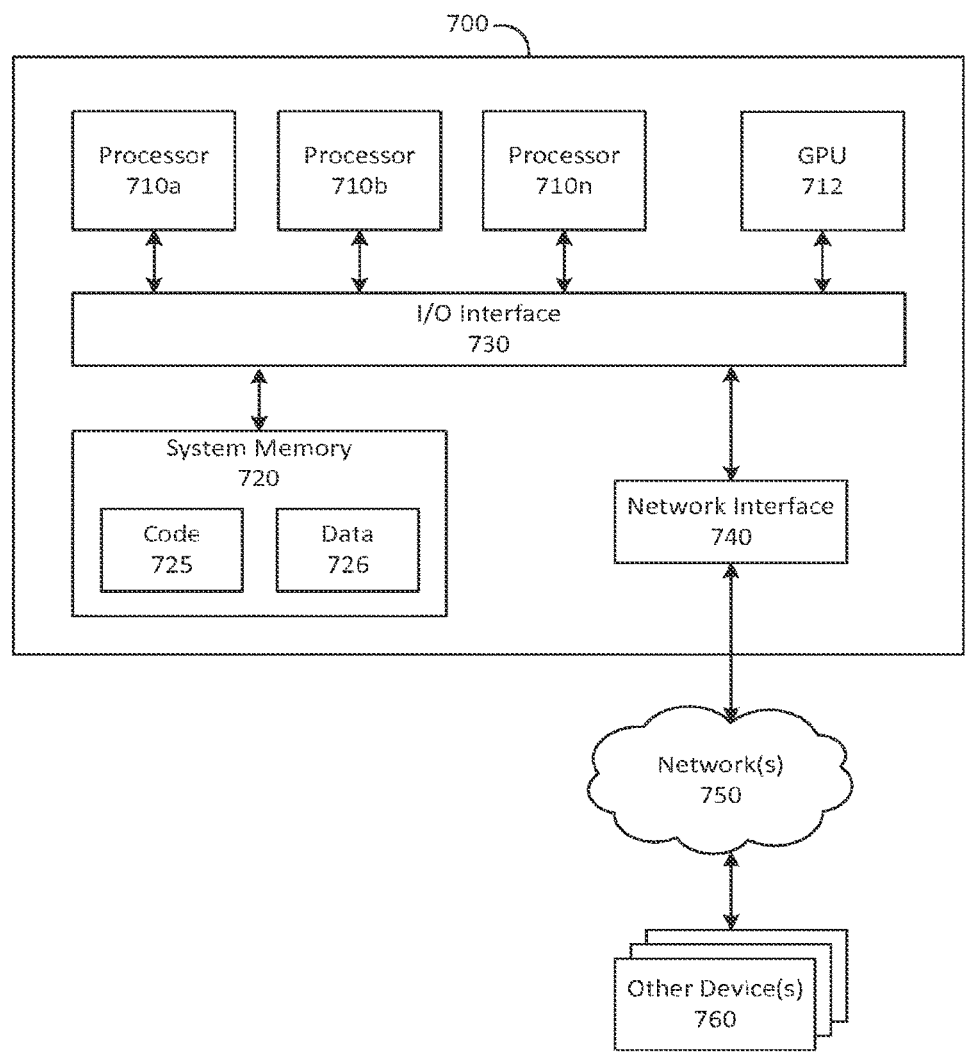
FIG. 7 depicts a computer that may be part of a datacenter, such as in FIG. 5.

Turning now to the figures, they begin with example environments in which these techniques may be implemented (FIG. 1). Then, they move to example operating procedures and data flows that may be implemented to perform some of these techniques (FIGS. 2-4). And they conclude with further detail of example environments in which these techniques may be implemented (FIGS. 5-7).

FIG. 1 depicts an example operating environment in which aspects may be implemented. In aspects, web services platform 150 may communicate with customer computer 102 via Internet 104. Web services platform 150 may provide computing services to customer computer 102 by executing one or more virtual machine (VM) instances 116 on a computer of computer rack A 106A or computer rack B 106B. Computing service may be under the direction of customer computer 102 such as a user device, thin client, or virtual station. One or more VM instances 116C may be configured independently of one or more computer racks 106. Web services platform 150 may also serve web pages to customer computer 102 from web server 112, or store data for customer computer 102 in object-level storage 114. In aspects, object-level storage 114 may store data as objects (e.g., files). It test may be appreciated that there are aspects where a block-level storage service is implemented instead of, or in addition to, storage 114.

The components of web services platform 150—computer rack A 106A, computer rack B 106B, node manager 107, task scheduler 108, web server 112, and object-level storage 114—may be connected to each other via intranet 120. The node manager 107 may be configured to manage the launch (e.g., initialization, start-up, recovery, configuration, registration, bringing online, etc.) of one or more computing nodes such as computer racks 106A, 106B and virtual machine instances 116 (depicted here as VM instance 116A, VM instance 116B, and VM instance 116C). The task scheduler 108 may be integrated with the node manager 107 or may be a distinct component. Intranet 120 may comprise networking equipment such as switches, routers, firewalls, and load balancers.

In an aspect, task scheduler 108 may automate the movement and processing of any amount of data using data-driven workflows and dependency checking. The task scheduler 108 may allow one or more compute tasks to be executed once, executed a defined number of times, executed in response to an activation and/or may allow tasks to run indefinitely and/or run repeatedly within a time range. The task scheduler 108 receives and processes information in determining an execution schedule for one or more tasks. Such information may comprise sources of the tasks, existing schedules, dependencies, and process load of each task or a group of tasks. When a task is completed, the final success or failure of the task can be reported, for example, to the web service provider. Efficiency of resource allocation can be optimized by supporting different schedule periods for a resource and an associated task execution. For example, a particular resource such as a computing node may be configured on a 60 minute schedule. When paired with a task that has a 20-minute schedule, the task scheduler 108 can configure the computing node to service three instances of the task in an hour, thus maximizing usage of the resource. Other configurations of tasks and computing nodes can be used, such as described in reference to FIG. 2.

In an aspect, one or more monitors 109 (e.g., sensors, devices, services, processes, recorders, logging components, etc.) may be in communication with one or more computing nodes and/or communication links between two or more computing nodes. The one or more monitors 109 may be configured to receive or access information relating to the one or more computing nodes. The one or more monitors 109 may be configured to receive or access information relating to an operational environment of one or more computing nodes. Such environmental information may relate to the architecture, data flow, resource allocation, availability (e.g., uptime), and/or other parameters relating to one or more computing nodes. The one or more monitors 109 may be configured to receive a data dump of information and/or may be configured to process the received or accessed data to filter at least a portion of the received or accessed data. The one or more monitors 109 may be disposed locally to the one or more computing nodes or remotely therefrom.

In an aspect, a datastore 111 may be in communication with one or more of the task scheduler 108, the one or more monitors 109, and computing nodes. The datastore 111 may be configured to store information received or accessed from the one or more monitors 109 and/or the task scheduler 108, for example. The datastore 111 may be configured to store one or more operational parameters relating to one or more computing nodes and/or process parameters relating to one or more tasks for execution.

Computer rack A 106A and computer rack B 106B are physical racks configured to hold one or more physical computers, such as physical host computer 118. In turn, each physical host computer is configured to execute one or more virtual machine instances 116 and a host partition 110. These VM instances may execute on behalf of customer computer 102 (or another entity) to provide compute services to customer computer 102.

As depicted, web services platform 150 is divided into two logical components—web services network 160 and production network 170. In turn, as depicted, web services network 160 generally comprises a portion of web services platform 150 that offers compute services to users. In turn, production network 170 as depicted comprises web server 112 and object-level storage 114, and may generally host a web site for web services platform 150. Other configurations of the web services platform 150 may be implemented. For example, the task scheduler 108 may be part of the web services network 160 and/or the production network 170 or may be a stand-alone component.

Web services network 160 and production network 170 may be considered to be separate intranets within web services platform 150, where communications between the two intranets is generally restricted relative to communications within an intranet. For example, each intranet may host a computer that has the same Internet Protocol (IP) address, and so addressing communications between these two computers may involve some degree of Network Address Translation (NAT) that may not be involved in communications between two computers solely within production network 170.

FIG. 2 depicts example data flows for scheduling tasks to one or more computing nodes, such as computer racks 106A, 106B and/or VM instances 116 of FIG. 1. In an aspect, the task scheduler 108 can determine (e.g., access, receive, poll, etc.) operational parameters relating to a plurality of computing nodes such as computer rack A 106A and computer rack B 106B. As an example, the computing nodes can advertise information relating to topology/infrastructure, resource dependency, current operations, a user identifier, a node occupancy, a number of nodes, a node size, a node type, license information, a node location, a service region, a scheduled maintenance, or a time limit. As another example, the task scheduler 108 can receive the operational information from one or more monitors 109.

The task scheduler 108 may receive a plurality of requests for execution of a plurality of compute tasks. The requests may be received from the customer computer 102, for example. In an aspect, the task scheduler 108 may determine process parameters relating to each request and/or the underlying computer task. As an example, the process parameters may comprise information relating to the processing cost of the task. As another example, the process parameters may comprise metadata relating to the task. As a further example, the metadata may comprise a user identifier, a priority metric, dependency information, and/or license information (e.g., remaining license units). In an aspect, user-provided information can be received by the task scheduler. Such user-provided information may comprise a task profile including user-defined priorities and task preferences. Based on operational parameters of the computing nodes and process parameters of the compute tasks to be executed, one or more of the computing nodes can be selectively clustered to compute tasks in an optimized manner. As an example, particular tasks or clusters of tasks may be matched (e.g., resource matching 202) with one or more computing nodes to maximize processing efficiency. As a further example, a task order 202 in which the tasks are executed can be determined to maintain the optimization of the task execution. Parallel and serial ordering may be used.

In an aspect, task constraints 204 may be leveraged in determining one or more of an order and manner of execution of one or more tasks. Task constraints may include license constraints (remaining license units for a group or particular user), resource consumption, dependencies, predicate operations, user-provided constraints such as priority or timing constraints, etc. In certain aspects, license information may be leveraged to determine the order and/or manner of execution of one or more tasks. Such license information may relate to a number of license units/resource units available to a particular user or group of users. Such license units may control the authorization of the user(s) to execute certain tasks. License units may be task level, resource level, or may be categorized in other categories for managing authorization.

FIG. 3 depicts example operating procedures for exposing network health over one or more network connections, such as network 104 and/or network 120 relating to the web services platform of FIG. 1. In some embodiments, the operating procedures of FIG. 3 may be implemented by node manager 107 and/or task scheduler 108 of FIG. 1 to intelligently schedule and/or manage the manner of execution of one or more compute tasks. It may be appreciated that there are embodiments that do not implement all of the operating procedures depicted in FIG. 3, or implement the depicted operating procedures in a different order than is depicted.

In an aspect, the operating procedures of FIG. 3 may begin with operation 302 and may move to operation 304. Operation 304 depicts determining operational parameters relating to the plurality of computing nodes. As an example, at least one computing node of the plurality of computing nodes may be configured to be selectively allocated for executing one or more compute tasks. As such, one or more monitors 109 may be in communication with the at least one computing node to receive or access information relating to execution of one or more compute tasks and or an environment of the at least one computing node. The operational parameters may comprise information such as topology/infrastructure, resource dependency, current operations, a user identifier, node occupancy, a number of nodes, a node size, a node type, license information, a node location, a service region, a scheduled maintenance, or a time limit.

Operation 306 depicts receiving a one or more tasks (e.g., requests for execution of a compute task). As an example, the node manager 107 and/or task scheduler 108 may receive the one or more tasks. Tasks may be logically received via various networks and from various sources such as virtual machine (VM) instances 116, computer rack A 106A, computer rack B 106B, and/or customer computer 102. Tasks may relate to compute processes for execution by one or more computing nodes.

Operation 308 depicts determining process parameters relating to at least one of the tasks (e.g., requests). The process parameters may comprise detailed information relating to the task such as resource consumption, timing information, license information (e.g., license units), predicate operations, dependencies, and/or other attributes. As an example, certain tasks may be required to execute in a functional order, such that one task is an operational predicate to another dependent task. Determining the process parameters may comprise accessing or receive information such as metadata or stored information relating to the underlying tasks. Such information may be received along with the received tasks or may be stored separately and logically mapped to the tasks.

Operation 310 depicts selecting, based at least in part on the determined operational parameters and the determined process parameters, one or more first computing nodes of the plurality of computing nodes to execute a particular compute task or group of tasks. Similarly, one or more second computing nodes of the plurality of computing nodes may be selected to execute a second compute task or second group of tasks. Such a selection may be executed by node manager 107 and/or task scheduler 108 and may comprise an identification or designation of particular ones of the computing nodes for subsequent processing. The selection of one or more computing nodes may include configuring the one or more computing nodes for customized execution of one or more tasks. The selection of one or more computing nodes may include matching one or more tasks to a pre-configured computing node for optimized execution.

Operation 312 depicts determining, based at least in part on the determined operational parameters and the determined process parameters, an order in which to cause execution of the compute tasks. Such determination may be based on predetermined or dynamically changing rules. As an example, a particular customer may have five license units, which are all in use at time (t1). As such, tasks that don't use license units may be prioritized. When a license becomes available, tasks that are dependent on available license may become a priority (e.g. to avoid having unused licenses). Task constraints may be leveraged in determining one or more of an order and manner of execution of one or more tasks. Task constraints may include license constraints (remaining license unites for a group or particular user), resource consumption, dependencies, predicate operations, user-provided constraints such as priority or timing constraints, etc. In certain aspects, license information may be leveraged to determine the order and/or manner of execution of one or more tasks. Such license information may relate to a number of license units/resource units available to a particular user or group of users. Such license units may control the authorization of the user(s) to execute certain tasks. License units may be task level, resource level, or other category for managing authorization. The order may be parallel or serial or a combination of both. The order may be updated as task executions fail or are completed.

Operation 314 depicts at least one compute task may be caused to execute based at least in part on the determined order. Operation 316 depicts determining whether additional compute tasks or request for execution of compute tasks exist. If additional tasks require scheduling, the procedure may return to any operation such as operation 304. Otherwise, the operating procedure of FIG. 3 may end at 318.

FIG. 4 depicts example operating procedures for scheduling tasks in a heterogeneous environment, such as the web services platform of FIG. 1. In some embodiments, the operating procedures of FIG. 4 may be implemented by node manager 107 and or task scheduler 108 of FIG. 1. It may be appreciated that there are embodiments that do not implement all of the operating procedures depicted in FIG. 4, or implement the depicted operating procedures in a different order than is depicted. The operating procedures of FIG. 4 may begin with operation 402 and may move to operation 404. Operation 404 may follow one or more of operations 310, 21, or 314 in FIG. 3.

Operation 404 depicts receiving feedback relating to the execution of one or more tasks. As an example, computing nodes may report information relating to the status of execution of one or more compute tasks. As another example, computing nodes may be polled to retrieve status information. As a further example, the information may comprise a level of completion or a failure.

Operation 406 depicts updating the selection of computing nodes for execution of a particular task or a group of tasks. In an aspect, the selection of one or more computing nodes may be updated based upon the received feedback. Such a selection may be executed by node manager 107 and/or task scheduler 108. The selection of one or more computing nodes may include configuring the one or more computing nodes for customized execution of one or more tasks. The selection of one or more computing nodes may include matching one or more tasks to a pre-configured computing node for optimized execution.

Operation 408 depicts updating the order of execution certain tasks or a group of tasks. In an aspect, the order of execution may be updated based upon the received feedback. The order may be parallel or serial or a combination of both. The order may be updated as task executions fail or are completed.

Operation 410 depicts at least one compute task may be caused to execute based at least in part on the determined order. Operation 412 depicts determining whether additional feedback has been received. If additional feedback is received, the procedure may return to any operation such as operation 406. Otherwise, the operating procedure of FIG. 4 may end at 414.

FIGS. 5-7 are similar to FIG. 1 in that they depict example operating environments in which aspects disclosed herein may be implemented, and said figures depict these operating environments at varying levels of granularity. FIG. 5 generally depicts a web services platform that comprises a plurality of datacenters. FIG. 6 generally depicts a datacenter that comprises a plurality of computers. FIG. 7 generally depicts a computer that may be part of a datacenter. Any of the devices, computers, servers, and/or instance may be considered computing nodes, as used herein.

It may be appreciated that the operating environments of FIGS. 5-7 may be used to implement aspects of the operating environment of FIG. 1. For example, web services platform 150 and its components may be implemented in web services platform 508 of FIG. 5. Likewise, Internet 104 of FIG. 1 may be wide area network 506 of FIG. 5, physical host computer 106, node manager 107, task scheduler 108, web server 112, and object-level storage 114 may each be customer computing system 504 of FIG. 5 and/or computing device 700 of FIG. 7.

Turning now to details of FIG. 5, this figure depicts an example of a suitable computing environment in which aspects described herein may be implemented. A cloud service provider (such as web services platform 508) may configure the illustrated computing environment to host virtual clouds of entities and to enable communication paths between these virtual clouds that may otherwise be isolated. In particular, FIG. 5 is a system and network diagram that shows an illustrative operating environment 500 that includes a web services platform 508 for implementing virtual clouds and for providing on-demand access to compute resources, such as virtual machine instances. Web services platform 508 may provide compute resources for executing applications on a permanent or an as-needed basis and may be configured as a private network. These compute resources may include various types of resources, such as data processing resources, data storage resources, data communication resources, and the like. Each type of compute resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of compute resource may be available in different sizes, such as large resources consisting of many processors, large amounts of memory, and/or large storage capacity, and small resources consisting of fewer processors, smaller amounts of memory, and/or smaller storage capacity. Entities may choose to allocate a number of small processing resources as web servers and/or one large processing resource as a database server, for example.

The compute resources provided by web services platform 508 may be enabled by at least one datacenters 502A-502N, which may be referred herein singularly as "datacenter 502" or in the plural as "datacenters 502." Datacenters 502 may be facilities that house and operate computer systems and associated components and may include redundant and backup power, communications, cooling, and security systems. Datacenters 502 may be located in a same geographical area, such as in a same facility, and may be interconnected using private networks, such as high-speed fiber optic networks, controlled and managed by a service provider of web services platform 508. Datacenters 502 may also be distributed across geographically disparate locations and may be interconnected in part using public networks, such as the Internet. One illustrative configuration for datacenter 502 that implements the concepts and technologies disclosed herein is described below with regard to FIG. 5.

Entities of web services platform 508 may access the compute resources (e.g., computing nodes) provided by datacenters 502 over a wide area network (WAN) 506. Although a WAN is illustrated in FIG. 5, it should be appreciated that a local area network (LAN), the Internet, or any other networking topology known in the art that connects datacenters 502 to remote entities and other users may be utilized. It should also be appreciated that combinations of such networks may also be utilized.

An entity or other entities that are customers of web services platform 508 may utilize a customer computing system 504 to access the compute resources provided by datacenters 502. Customer computing system 504 comprises a computer capable of accessing web services platform 508, such as a server computer, a desktop or laptop personal computer, a tablet computer, a wireless telephone, a PDA, an e-reader, a game console, a set-top box, or any other computing node.

As is described in greater detail below, customer computing system 504 may be utilized to configure aspects of the compute resources provided by web services platform 508. In this regard, web services platform 508 may provide a web interface through which aspects of its operation may be configured through the use of a web browser application program executing on customer computing system 504. Alternatively, a stand-alone application program executing on customer computing system 504 may access an application programming interface (API) (not shown) exposed by web services platform 508 for performing the configuration operations. Other mechanisms for configuring the operation of web services platform 508, including launching new virtual machine instances on web services platform 508, may also be utilized.

According to aspects disclosed herein, capacities of purchased compute resources provided by web services platform 508 may be scaled in response to demand. In this regard, scaling refers to the process of instantiating, which may also be referred to herein as "launching" or "creating," or terminating, which may also be referred to herein as "de-scaling," instances of compute resources in response to demand.

Web services platform 508 may also be configured with a deployment component to assist entities in the deployment of new instances of compute resources. The deployment component may receive a configuration from an entity that may include data describing how new instances should be configured. For example, the configuration may specify at least one applications or software components that should be installed in new instances provide scripts and/or other types of code to be executed in new instances, provide cache warming logic specifying how an application cache should be prepared, and other types of information. The deployment component utilizes the entity-provided configuration and cache warming logic to launch, configure, and prime new instances of compute resources.

FIG. 6 is a diagram depicting an example of a distributed computing environment on which aspects of the present invention may be practiced. Various users 600a may interact with various client applications, operating on any type of computing device 602a, to communicate over communications network 604 with processes executing on various computing nodes 610a, 610b, and 610c (e.g., computing nodes) within a data center 620. Alternatively, client applications 602b may communicate without user intervention. Communications network 604 may comprise any combination of communications technology, including the Internet, wired and wireless local area networks, fiber optic networks, satellite communications, and so forth. Any number of networking protocols may be employed.

Communication with processes executing on the computing nodes 610a, 610b, and 610c, operating within data center 620 (which may be similar in data center 502), may be provided via gateway 606 and router 608. Numerous other network configurations may also be employed. Although not explicitly depicted in FIG. 6, various authentication mechanisms, web service layers, business objects or other intermediate layers may be provided to mediate communication with the processes executing on computing nodes 610a, 610b, and 610c. Some of these intermediate layers may themselves comprise processes executing on one or more of the computing nodes. Computing nodes 610a, 610b, and 610c, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610a is depicted as residing on physical hardware comprising one or more processors 616, one or more memories 618 and one or more storage devices 614. Processes on computing node 610a may execute in conjunction with an operating system or alternatively may execute as a bare-metal process that directly interacts with physical resources, such as processors 616, memories 618, or storage devices 614.

Computing nodes 610b and 610c are depicted as operating on virtual machine host 612, which may provide shared access to various physical resources, such as physical processors, memory and storage devices. Any number of virtualization mechanisms might be employed to host the computing nodes.

The various computing nodes depicted in FIG. 6 may be configured to host web services, database management systems, business objects, monitoring and diagnostic facilities, and so forth. The computing nodes can be or comprise computing nodes. Computing nodes may be services or compute processes executing via one or more computing nodes. A computing node may refer to various types of computing resources, such as personal computers, servers, clustered computing devices, and so forth. A computing node may, for example, refer to various computing devices, such as cell phones, smartphones, tablets, embedded device and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

In at least some embodiments, a server that implements a portion or all of one or more of the technologies described herein may include a general-purpose computer system that includes or is configured to access one or more computer-accessible media.

FIG. 7 depicts a general-purpose computer system that includes or is configured to access one or more computer-accessible media. In the illustrated embodiment, computing device 700 includes one or more processors 710a, 710b, and/or 710n (which may be referred herein singularly as a processor 710 or in the plural as the processors 710) coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processor(s) 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 710. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor(s) 710, system memory 720 and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 620, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes or computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on), and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may comprise any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for scheduling compute tasks to one or more computing nodes of a plurality of computing nodes associated with a web services platform, the method comprising:

receiving, via the web services platform, operational parameters of the plurality of computing nodes, wherein at least one computing node of the plurality of computing nodes is a virtual computing node configured to be selectively allocated for executing one or more compute tasks, and wherein the operational parameters comprise a performance characteristic of at least the virtual computing node associated with a capability of at least the virtual computing node to execute compute tasks;

receiving, via a network in communication with the web service platform, a first request for execution of a first compute task;

receiving a second request for execution of a second compute task;

determining, based on at least the first request and the second request, one or more process parameters relating to resource requirements to perform the execution of the first compute task and the second compute task;

selecting, based at least in part on the received operational parameters and the determined process parameters, one or more first computing nodes of the plurality of
computing nodes to execute the first compute task;
selecting, based at least in part on the received operational
parameters and the determined process parameters, one
or more second computing nodes of the plurality of
computing nodes to execute the second compute task;
determining, based at least in part on the received operational parameters and the determined process parameters and by applying the one or more dynamic changing rules, an order in which to cause execution of at least the first compute task and the second compute task by the selected one or more first computing nodes and the selected one or more second computing nodes; and
causing execution of at least the first compute task and the second compute task by the selected one or more first computing nodes and the selected one or more second computing nodes based at least in part on the determined order, wherein the execution by the selected one or more first computing nodes is dependent on a first optimization constraint and the execution by the selected one or more second computing nodes is dependent on a second optimization constraint different from the first optimization constraint.

2. The method of claim 1, wherein the operational parameters comprise at least one of a node occupancy, a number of nodes, an node size, a node type, a node location, a service region, or a scheduled maintenance.

3. The method of claim 1, wherein the process parameters comprise license information associated with the source of at least one of the first request and the second request.

4. The method of claim 1, wherein one or more of the first optimization constraint and the second optimization constraint comprises minimizing execution cost, minimizing execution time, or maximizing utilization percentage.

5. A system for scheduling compute tasks to one or more computing nodes of a plurality of computing nodes associated with a web services platform, comprising: a processor; and a memory bearing instructions that, upon execution by the processor, cause the system at least to:
determine, based on at least on information received via a monitor associated with the web services platform, operational parameters of the plurality of computing nodes, wherein the operational parameters comprise a performance characteristic of at least one virtual computing node associated with a capability of the at least one virtual computing node to execute compute tasks;
receive, via a network in communication with the web service platform, a request for execution of a compute task;
determine process parameters relating to the request for execution of the compute task, wherein process parameters comprise a task constraint relating to at least a number or type of licenses associated with a source of the request for execution of the compute task;
select, based at least in part on the determined operational parameters and the determined process parameters, one or more computing nodes of the plurality of computing nodes to execute the compute task;
determine, based at least in part on the determined operational parameters and the determined process parameters and by applying one or more dynamic changing rules, an order in which to cause execution of the compute task by the selected one or more compute nodes; and
cause execution of at least the compute task by the selected one or more computing nodes, wherein the execution by the select one or more computing nodes is dependent on an optimization constraint.

6. The system of claim 5, wherein the operational parameters comprise at least one of a node occupancy, a number of nodes, an node size, a node type, a node location, a service region, and a scheduled maintenance.

7. The system of claim 5, wherein the process parameters comprise at least one of a processing cost, a user identifier, a priority metric, dependency information, or license information.

8. The system of claim 5, wherein the operational parameters are determined by polling one or more of the computing nodes.

9. The system of claim 5, wherein the operational parameters are determined by receiving advertised parameter information.

10. The system of claim 5, wherein the select one or more computing nodes of the plurality of computing nodes represents a customized partition of the plurality of computing nodes configured to execute tasks based on at least the optimization constraint.

11. The system of claim 5, wherein execution of at least the compute task is based at least in part on a task schedule.

12. The system of claim 5, wherein the task schedule comprises at least one of a parallel or a serial task execution order.

13. A non-transitory computer-readable storage medium having stored thereon computer-readable instructions, the computer-readable instructions comprising instructions that upon execution on one or more computing devices, at least cause the one or more computing devices to:
determine operational parameters of a plurality of computing nodes associated with a web services platform wherein at least one computing node of the plurality of computing nodes is a virtual computing node, and wherein the operational parameters comprise a performance characteristic of at least the virtual computing node associated with a capability of the at least one virtual computing node to execute compute tasks;
receive a plurality of requests for execution, wherein each of the requests for execution relate to a respective compute task;
determine process parameters relating to each of the requests for execution;
select, based at least in part on the determined operational parameters and the determined process parameters, a cluster of compute nodes of the plurality of computing nodes associated with the web services platform to execute the compute tasks;
determine, based at least in part on the determined operational parameters and the determined process parameters and by applying the one or more dynamic changing rules, an order in which to cause execution of the compute tasks by the cluster of compute nodes; and
cause execution of at least one of the compute tasks by the cluster of compute nodes based at least in part on the determined order, wherein the execution by the cluster of compute nodes is dependent on an optimization constraint.

14. The non-transitory computer-readable storage medium of claim 13, wherein the operational parameters comprise at least one of a user identifier, a node occupancy, a number of nodes, an node size, a node type, license information, a node location, a service region, a scheduled maintenance, or a time limit.

15. The non-transitory computer-readable storage medium of claim 13, wherein the process parameters comprise at least one of a processing cost, a user identifier, a priority metric, dependency information, or license information.

16. The non-transitory computer-readable storage medium of claim 13, wherein the operational parameters are determined by polling one or more of the computing nodes.

17. The non-transitory computer-readable storage medium of claim 13, wherein the operational parameters are determined by receiving advertised parameter information.

18. The non-transitory computer-readable storage medium of claim 13, further comprising instructions that upon execution on one or more computing devices, at least cause the one or more computing devices to group one or more of the compute tasks into a process cluster based at least in part on the determined operational parameters and the determined process parameters, wherein the order is determined based at least in part on the compute tasks grouped into the processes cluster.

19. The non-transitory computer-readable storage medium of claim 13, further comprising instructions that upon execution on one or more computing devices, at least cause the one or more computing devices to:

receive a report relating to the execution of at least one of the compute tasks; and update the order in which to cause execution of the compute tasks based at least in part on the report.

20. The non-transitory computer-readable storage medium of claim 13, further comprising instructions that upon execution on one or more computing devices, at least cause the one or more computing devices to:

receive a report relating to the execution of at least one of the compute tasks; and select, based at least in part on the determined operational parameters and the determined process parameters, an updated cluster of compute nodes of the plurality of computing nodes associated with the web services platform to execute the compute tasks.

\* \* \* \* \*